R. J. ROSS.
SCOOP FOR EMPTYING PANS.
APPLICATION FILED OCT. 21, 1910.
1,006,407.
Patented Oct. 17, 1911.
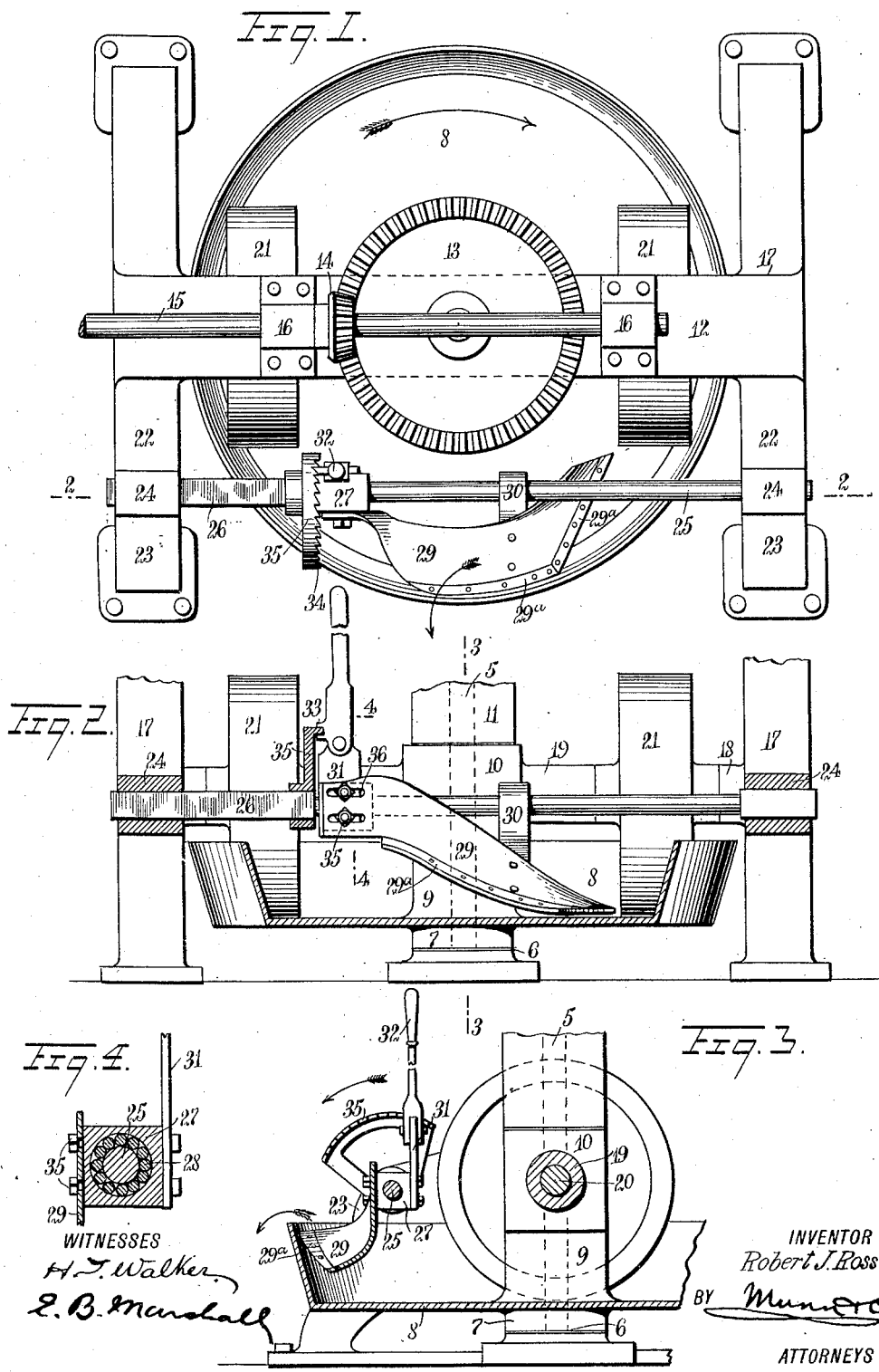
WITNESSES
H. T. Walker
E. B. Marshall
INVENTOR
Robert J. Ross
BY
ATTORNEYS

UNITED STATES PATENT OFFICE.

ROBERT J. ROSS, OF OLIVE HILL, KENTUCKY, ASSIGNOR OF ONE-THIRD TO HERMAN B. CAMPBELL AND ONE-THIRD TO LESLIE C. TURLEY, OF PORTSMOUTH, OHIO.

SCOOP FOR EMPTYING PANS.

1,006,407. Specification of Letters Patent. Patented Oct. 17, 1911.

Application filed October 21, 1910. Serial No. 588,273.

*To all whom it may concern:*

Be it known that I, ROBERT J. ROSS, a citizen of the United States, and a resident of Olive Hill, in the county of Carter and State of Kentucky, have invented a new and Improved Scoop for Emptying Pans, of which the following is a full, clear, and exact description.

My invention relates to scoops for emptying pans and it has for its object to provide a shovel or plow which is mounted to rotate on a shaft disposed over the pan so that it may be rotated into or out of operative position, a lever being pivoted to the shovel or plow and being adapted to engage a ratchet in a sector member for holding the shovel or plow in a predetermined position.

Additional objects of the invention will appear in the following specification in which the preferred form of my invention is disclosed.

In the drawings similar characters of reference indicate corresponding parts in all the views, in which—

Figure 1 is a plan view showing a pan provided with my improvement; Fig. 2 is a sectional view on the line 2—2 of Fig. 1; Fig. 3 is a sectional view on the line 3—3 of Fig. 2; and Fig. 4 is a sectional view on the line 4—4 of Fig. 2.

By referring to the drawings it will be seen that a vertically disposed shaft 5 is journaled at its lower end in a bearing 6, this shaft 5 being disposed in a bearing member 7, depending from a pan 8, and also in a bearing member 9 secured to and extending upwardly from the bottom of the pan 8. The shaft 5 is also disposed through a collar 10 and a bearing member 11, secured to the cross beam 12. To the shaft 5 above the cross beam 12 there is secured a gear wheel 13, with which meshes a bevel gear wheel 14, secured to a shaft 15 journaled in bearings 16 mounted on the top of the cross beam 12. The shaft 15, through the members described, is adapted to rotate the shaft 5, and the pan 8 secured thereto. The cross beam 12 is supported on standards 17, which have inwardly extending bearings 18 disposed in alinement with outwardly extending bearings 19 secured to the collar 10. In these bearings 18 and 19 are journaled the shafts 20 of two crushing rollers 21. Secured to the base members 22 of the standards 17 there are supports 23 having bearings 24 in one of which is disposed a shaft 25, an arm 26 being disposed in the opposite bearing 24, the shaft 25 being journaled in a bearing in the arm 26.

A box 27 is mounted to rotate on the shaft 25, bearing balls 28 being disposed in channels between the shaft 25 and the inner side of the box 27 to prevent unnecessary friction. To this box 27 is secured one end of the shovel or plow 29, an arm 30 being journaled to the shaft 25, and being secured to the shovel or plow 29 between its terminals to provide additional support. To the box 27 there is also secured an arm 31 to which is articulated a lever 32. This lever 32 has a tooth 33, adapted to engage ratchet teeth 34 on a sector member 35, secured to the arm 26. As shown in Fig. 2 of the drawings, the bolts which engage the box 27 and support the plow or shovel 29 are disposed in slots 36 in the said plow or shovel, so that the plow or shovel may be moved longitudinally of the shaft 25 and may be secured to the said box 27 in a predetermined position relatively to the pan 8. It is therefore possible to adjust the shovel or plow 29 so that it will be disposed, when lowered, with its right-hand terminal in any one of a plurality of positions relatively to the periphery of the pan.

In using the invention when the material is dumped into the pan and the water has been added, the shaft 15 is rotated, which, by means of the members described, rotates the shaft 5, carrying with it the pan 8, the bearing member 9 being secured to the said shaft 5. As the pan is rotated the rollers 12 will rotate on their axes and will grind and mix the water and the material which has been deposited in the pan. When the grinding and mixing has been completed, the lever 32 is moved so that its tooth 33 is out of engagement with the ratchet teeth of the sector member 35, when the shovel or plow 29 may be lowered into the pan 8 by the rotation of the lever 32 relatively to the shaft 25. When this has been done the shovel or plow 29 will be disposed in the position shown in Fig. 2 of the drawings, and as the pan 8 is further rotated the material will be engaged by the right-hand terminal of the plow or shovel and will be moved upwardly on the said plow or shovel which is disposed to throw the said material out of the pan. When the pan has been emptied the lever 32 is again freed from the ratchet teeth of the sector member 35, when the shovel or plow 29 is raised out of the pan by the rotation of the box 27 on the shaft 25 by means of the lever 32.

As will be seen by referring to the drawings members 29ᴬ are secured to the wearing edges at the bottom and end of the shovel or plow so that these parts may be readily renewed.

Having thus described my invention I claim as new and desire to secure by Letters Patent:

1. In combination with a pan having a side wall and adapted to be rotated, a horizontal shaft disposed over the pan, a shovel mounted longitudinally of the horizontal shaft and adapted to be rotated downwardly under the shaft and up against the side wall of the pan, the shovel when moved upwardly against the side wall of the pan extending upwardly from one horizontally disposed edge of its outer side, disposed against the side wall of the pan at a distance from the said edge, the inner side of the shovel at a distance from the said edge being disposed vertically, the shovel being adapted for raising material out of the pan.

2. In combination with a pan adapted to be rotated, a shaft disposed over the pan, a member mounted to rotate on the shaft, a shovel disposed longitudinally of the shaft, adapted to be adjusted longitudinally thereof and having a slot, a bolt connected with the member and disposed in the slot by which the shovel may be held in adjusted position relatively to the member, the shovel when lowered into operative position having a horizontal lower edge, the shovel at its outer side extending upwardly from the said edge to the periphery at the top of the pan, the inner side of the shovel being bent upwardly and converging with the outer side of the pan at the said edge, the shovel being adapted to raise material out of the pan when in operative position.

3. In combination with a pan having a side wall and adapted to be rotated, a horizontal shaft disposed over the pan, a member mounted to rotate on the shaft, a shovel having a slot disposed longitudinally of the shaft, adapted to be moved longitudinally thereof, into any one of a plurality of positions, relatively to the side wall, a bolt disposed in the slot, a nut on the bolt for holding the shovel relatively to the member, the shovel when rotated under the shaft and up against the side wall, being adapted to raise material out of the pan on the rotation of the pan.

In testimony whereof I have signed my name to this specification in the presence of two subscribing witnesses.

ROBERT J. ROSS.

Witnesses:
  BEN. CASSADY,
  J. B. DENNES.

---

Copies of this patent may be obtained for five cents each, by addressing the "Commissioner of Patents, Washington, D. C."